Feb. 25, 1930.  W. N. BOOTH  1,748,630
WIRE SPOKED VEHICLE WHEEL
Filed Sept. 7, 1926   2 Sheets-Sheet 2
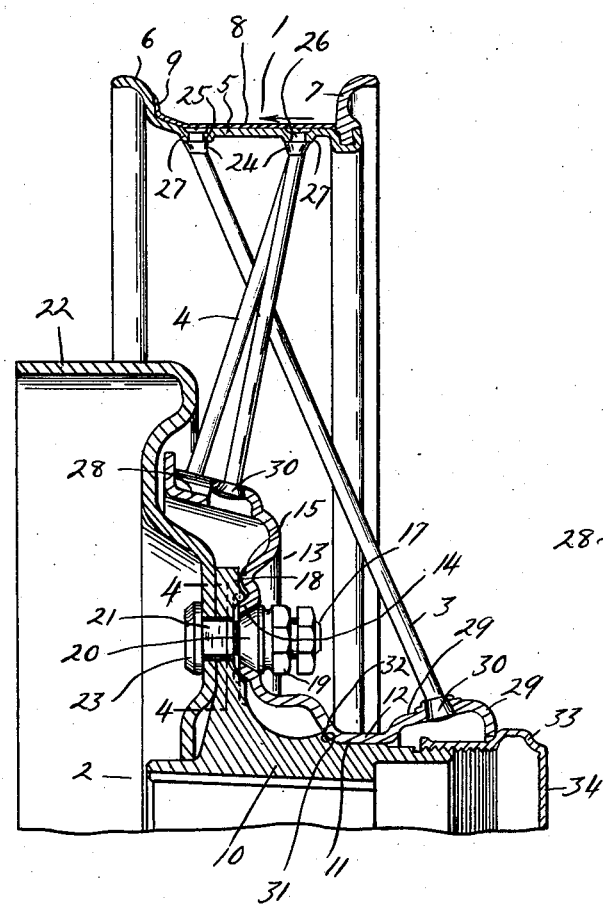
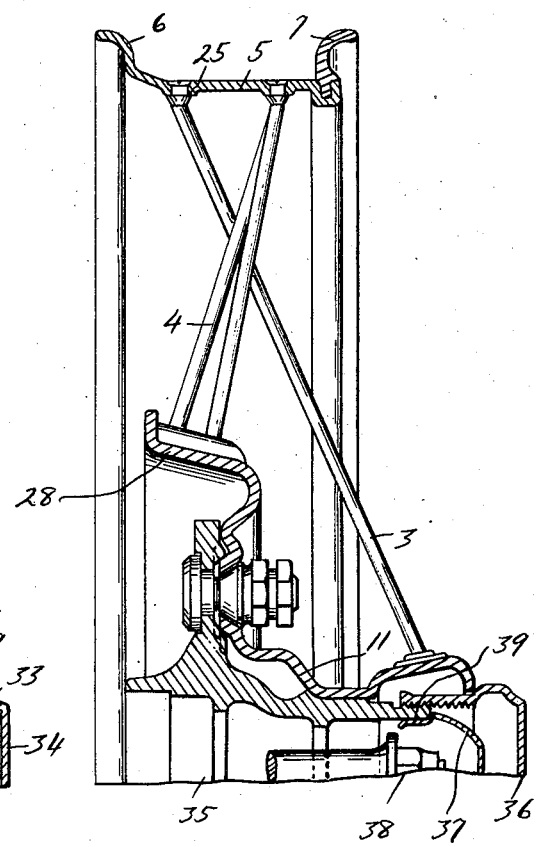
Inventor
William N. Booth
By
Attorneys Patented Feb. 25, 1930

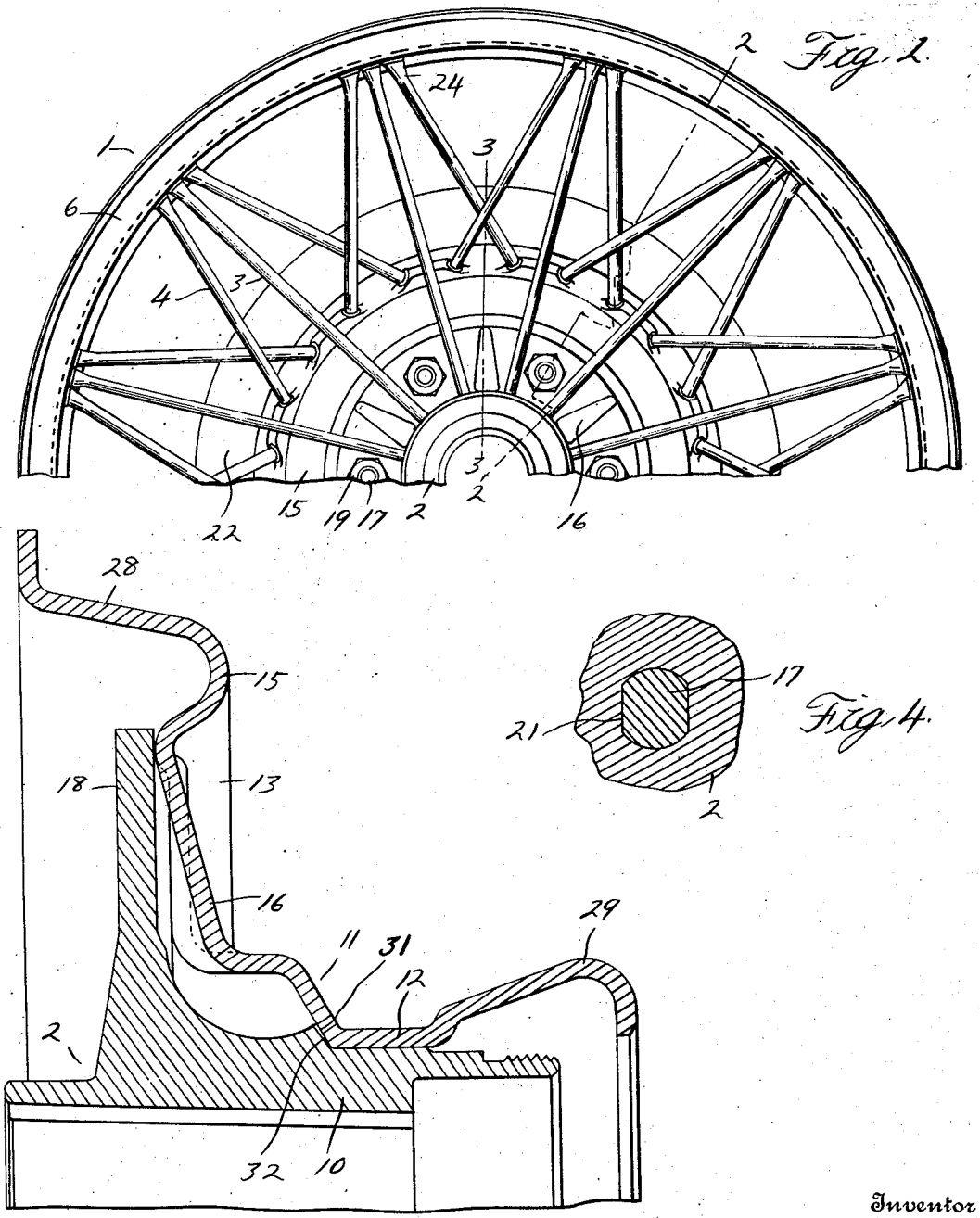

1,748,630

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

WIRE-SPOKED VEHICLE WHEEL

Application filed September 7, 1926. Serial No. 133,957.

The invention relates to vehicle wheels and refers particularly to that type having wire spokes. One of the objects of the invention is the provision of an improved construction of vehicle wheel having a wheel body detachably engageable with a hub member and so arranged that the means for securing the wheel body to the hub member provides for increasing the tension of the spokes forming part of the wheel body. Another object is to provide a vehicle wheel having an inner hub member and an outer hub member and a hub cap which is engageable with the inner hub member and extends beyond the outer hub member, thereby permitting of the use of a standard hub cap used in other types of wheels such as the wooden spoke type or the disk type. A further object is to provide a rust resisting shield upon the tire carrying rim for engaging the tire so that the latter may be freely removed from the rim and the usual flap omitted. With these as well as other objects in view, the invention resides in the novel features of construction and combinations and arrangements of parts as more fully hereinafter set forth.

In the drawings:—

Figure 1 is a side elevation of a portion of a vehicle wheel embodying my invention;

Figures 2 and 3 are cross sections on the lines 2—2 and 3—3, respectively, of Figure 1;

Figure 4 is a cross section on the line 4—4 of Figure 2;

Figure 5 is a view similar to Figure 2 showing a modified wheel.

The vehicle wheel shown in Figures 1, 2, 3 and 4 has the tire carrying rim 1, the hub 2 and the series of front and rear spokes 3 and 4, respectively, which extend between the hub and rim and support the former from the latter. The rim shown in the present instance has the base 5, the side flange 6 integral with the base and the side flange 7, which is detachable from the base.

For the purpose of readily removing the tire and at the same time permitting of the use of a tire without the usual flap for protecting the inner tube, I have provided the shield 8 which is formed of a suitable rust resisting material such as aluminum. This shield extends around the base 5 of the rim and as shown has the side flange 9 which is adapted to lie adjacent the inner face of the side flange 6 of the rim and at the outer side of the tire casing. With this construction the tire may be readily removed from the rim by detaching the side flange 7 from the rim and then drawing the tire off the shield or the tire and shield off the rim. Furthermore, by reason of the rust resisting shield, the use of the usual flap for protecting the inner tube is unnecessary.

The hub 2 is formed of the inner section 10 and the outer section or shell 11, which latter is engageable over the inner section and is detachably secured thereto. The outer section is formed of sheet metal preferably of greater thickness than that of the rim and has the annular depression 12 in its barrel intermediate its ends for slidably fitting the barrel of the inner section. The outer section also has the radial flange 13 at the rear end of its barrel provided with the angularly spaced tubular frusto-conical projections 14 and the annular rib 15 radially outward beyond its frusto-conical projections. The radial flange is preferably reinforced by the radially extending ribs 16 which are located between the frusto-conical projections. 17 are bolts which extend through the radial flange 18 upon the inner section 10 and are engageable by the nuts 19 which have frusto-conical ends 20 for engaging the frusto-conical projections 14 and forcing the latter into contact with the walls of the frusto-conical recesses in the radial flange 18 to thereby drive the outer section from the inner section without subjecting the bolts to a shearing stress. These bolts are preferably provided with flats 21, as shown particularly in Fig. 4 and the openings in the radial flange 18 are correspondingly shaped to hold the bolts from rotation. 22 is a brake drum having its web secured against the rear face of the radial flange 18 by the bolts 17 and for the purpose of fixedly securing the brake drum to the radial flange the bolts have the spun-over portions 23 for engaging in the countersunk portions at the front ends of the openings in the radial flange as disclosed in Figure 2.

The outer ends of the front and rear spokes are connected to the base 5 of the rim respectively at the rear and front edges thereof, while the inner ends of these spokes are respectively connected to the front and rear ends of the outer section 11 of the hub. The spokes are straight from their points of connection to the rim and outer section of the hub and have at their outer ends the enlargements 24 forming the shoulders 25 and the tenons 26. These tenons extend at an angle to the axes of the spokes and the shoulders are at right angles to the axes of the tenons and for the purpose of providing bearing faces for the shoulders and recesses for the peened-over heads at the outer ends of the tenons, the base 5 of the rim has the inwardly extending bosses 27. The radial flange 13 of the outer section of the hub is provided at its periphery with the transverse flange 28 while the front end of this outer section is provided with the annular bead 29. The inner ends of the front spokes extend through the rear face of the annular bead 29 while the inner ends of the rear spokes extend through the transverse flange. Both the front and rear spokes have at their inner ends the heads 30 which are engageable with the inner faces of the bead and transverse flange, the arrangement being such that the spokes are free to move longitudinally inward relative to the outer section of the hub. However, they are rigidly secured to the rim.

In assembling, the spokes may be inserted through the outer section of the hub from its inner side and their tenons engaged in the proper apertures in the base of the rim. An expanding arbor may then be inserted in the outer section of the hub to force the heads at the inner ends of the rear spokes firmly against the transverse flange of the outer section of the hub with a force sufficient to place this transverse flange under stress. The rim is then laterally forced in the direction of the arrow in Figure 2 to bring the shoulders 25 of the rear spokes firmly against the flat bearing faces formed by the bosses upon the base of the rim, after which the outer ends of the tenons may be peened over to form the heads within the recesses formed by these bosses, suitable gripping jaws being engageable with the spokes adjacent to their enlargements during this peening-over operation. The heads at the inner ends of the front spokes may then be forced firmly into contact with the outer section of the hub and with a force sufficient to place the adjacent portions of the hub under stress, after which the rim is moved in the direction opposite to that of the arrow shown in Figure 2 to bring the shoulders of these front spokes into firm contact with the flat faces formed by the bosses upon the base of the rim. The outer ends of the tenons may then be peened over with the peened over heads located in the recesses formed by these bosses, during which time suitable gripping jaws may clamp the spokes adjacent to their enlargements. After these operations the wheel body is then in condition to be secured to the inner section of the hub and both the front and rear series of spokes are under tension.

To increase the tension of the spokes and particularly of the rear spokes, the inner section 10 of the hub is provided with the shoulder 31 upon its barrel and the outer section of the hub is provided with the cooperating shoulder 32 upon its barrel. Furthermore, the radial flange 13 of the outer section is spaced and in fact inclined away from the radial flange 18 of the inner section before the clamping nuts 19 are tightened. When the outer section of the hub is engaged over the inner section, the shoulder 32 of the outer section engages the shoulder 31 of the inner section to limit further axial inward movement of the outer section, so that upon tightening the clamping nuts 19 the radial flange 13 of the outer section is flexed toward the radial flange 18 of the inner section until the annular rib 15 engages the front face of the radial flange 18 and the frusto-conical projections 14 engage the walls of the frusto-conical recesses in the radial flange 18, thereby increasing the tension of the spokes.

33 is the hub cap of that type used in other types of wheels such as the wooden spoked or disk wheels. This hub cap is threaded upon the inner section 10 of the hub and extends through the opening in the front end of the outer section 11 of the hub and has the enlarged polygonal portion 34 which may be engaged by a suitable tool and which is adapted to abut against the front end of the outer section to assist in frictionally holding the hub cap in place.

The modification shown in Figure 5 is a front wheel and the arrangement of rim, front and rear spokes and outer section or shell of the hub as well as the manner of mounting this outer section upon the inner section of the hub is the same as that shown in Figure 2 particularly, the brake drum being omitted. In order to retain the lubricant within the inner section 35 of the hub upon removing the hub cap 36 to remove the wheel body, there is provided the cup-shaped imperforate shield 37 which is preferably formed of sheet metal and has its end resiliently slidably engaging within the front end of the inner section. This shield extends axially outwardly beyond the means such as the nut 38 for securing the inner section of the hub upon the shaft and has the body portion 39 which is adapted to abut the front end of the inner section to limit the axial inward movement of the shield and also provide means for removing the shield from the inner section.

What I claim as my invention is:

1. In a vehicle wheel, the combination with a hub member, of a wheel body comprising a rim, a second hub member and spokes extending between said rim and second hub member under tension when said wheel body is disconnected from said first-mentioned hub member, and means engageable with said second hub member for detachably securing said wheel body to said first-mentioned hub member, said second hub member being arranged to flex axially under the action of said securing means to increase the tension of said spokes.

2. In a vehicle wheel, the combination with a hub member, of a wheel body comprising a rim, a second hub member and series of front and rear spokes extending between said rim and second hub member under tension when said wheel body is disconnected from said first-mentioned hub member, and means engageable with said second hub member for securing said wheel body to said first-mentioned hub member, said hub members having portions radially inward of said securing means for limiting the relative movement of said hub members while being secured and said second hub member being arranged to flex under the action of said securing means to increase the tension of one of said series of spokes.

3. In a vehicle wheel, the combination with a hub member having a radial flange, of a wheel body comprising a rim, a second hub member having a radial flange and spokes extending between the radial flange of said second hub member and under tension when said wheel body is disconnected from said first-mentioned hub member, said hub members being axially movable relative to each other in assembling or disassembling said wheel body and said first-mentioned hub member and having cooperating shoulders for limiting the axial movement in assembling, and means engageable with the radial flange of said second hub member radially outward of said shoulders for securing said wheel body to said first-mentioned hub member, the radial flange of said second hub member being arranged to flex under the action of said securing means to increase the tension of said spokes.

4. In a vehicle wheel, the combination with a hub member, of a wheel body including a rim member, a second hub member and connecting members extending between said rim member and second hub member, said hub members being axially movable relative to each other in securing or removing said wheel body from said first mentioned hub member, cooperating means upon said hub members for limiting the relative axial movement thereof in securing said wheel body to said first mentioned hub member, and means radially outward beyond said cooperating means for securing said hub members to each other and flexing said second hub member after engagement of said cooperating means to effect tensioning of said connecting members.

5. In a vehicle wheel, the combination with a hub member, of a wheel body including a rim member, a second hub member having a radial flange and a plurality of series of spokes extending between said rim member and second hub member with one series connected to said radial flange, said hub members being axially movable relative to each other in assembling or disassembling said wheel body and said first mentioned hub member, cooperating means upon said hub members engageable to limit relative axial movement thereof in securing said wheel body to said first mentioned hub member, and means radially outward beyond said cooperating means and engageable with said radial flange for securing said hub members to each other and flexing said radial flange after engagement of said cooperating means to effect tensioning of said spokes.

6. In a vehicle wheel, the combination with a hub member having a radial flange, of a wheel body including a rim member, a second hub member having a radial flange and a plurality of series of spokes extending between said rim member and second hub member with one series connected into said radial flange, said hub members being axially movable relative to each other in assembling or disassembling said wheel body and said first mentioned hub member and having cooperating shoulders engageable to limit the axial movement in assembling, means radially outward beyond said cooperating shoulders for securing said hub members to each other and flexing said second mentioned radial flange after engagement of said cooperating shoulders to effect tensioning of said spokes, and cooperating means upon said radial flanges and encircling said securing means for driving said hub members together.

7. In a vehicle wheel, the combination with a hub member, of a wheel body comprising a rim, front and rear spokes connected to the rim, hub anchoring means for the front spokes, hub anchoring means for the rear spokes, the wheel body being axially movable relative to the hub member in assembling or disassembling the wheel body and hub member, means upon the hub member for limiting the axial movement of the front spoke hub anchoring means in assembling, and means for securing the wheel body to the hub member and axially moving the rear spoke hub anchoring means away from the other anchoring means to effect tensioning of all of the spokes.

8. In a vehicle wheel, the combination with a hub member, of a wheel body comprising a rim, front and rear spokes connected to the rim, hub anchoring means for the front spokes, hub anchoring means for the rear spokes, the wheel body being axially movable relative to the hub member in assembling or disassembling the wheel body and hub member, means upon the hub member for limiting the axial movement of one of the spoke hub anchoring means in assembling, and means for securing the wheel body to the hub member and axially moving the other of the hub anchoring means away from the first mentioned hub anchoring means to effect tensioning of all of the spokes.

In testimony whereof I affix my signature.

WILLIAM N. BOOTH.